(12) United States Patent
Kim et al.

(10) Patent No.: US 8,916,288 B2
(45) Date of Patent: Dec. 23, 2014

(54) LITHIUM RECHARGEABLE BATTERY AND METHOD OF MAKING THE SAME

(75) Inventors: Sungkab Kim, Yongin-si (KR); Sukje Kim, Yongin-si (KR); Seongwon Yoon, Yongin-si (KR); Gunho Kwak, Yongin-si (KR); Sunghoon Kim, Yongin-si (KR)

(73) Assignees: Samsung SDI Co., Ltd., Giheung-gu, Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 16 days.

(21) Appl. No.: 13/552,480

(22) Filed: Jul. 18, 2012

(65) Prior Publication Data

US 2013/0202950 A1   Aug. 8, 2013

(30) Foreign Application Priority Data

Feb. 7, 2012 (KR) .................. 10-2012-0012324

(51) Int. Cl.
*H01M 2/02* (2006.01)

(52) U.S. Cl.
USPC ............ 429/178; 429/163; 429/168; 429/170

(58) Field of Classification Search
USPC .................. 429/178, 163, 170, 168
See application file for complete search history.

(56) References Cited

U.S. PATENT DOCUMENTS

2010/0159144 A1   6/2010   Standke et al.
2012/0121974 A1*  5/2012   Tikhonov et al. ............. 429/200

FOREIGN PATENT DOCUMENTS

| JP | 63198260 A | * | 8/1988 |
| JP | 11-297330 | | 10/1999 |
| KR | 10-2001-0024006 | | 3/2001 |
| KR | 10-2008-0089458 | | 10/2008 |
| KR | 10-2010-0105105 | | 9/2010 |

* cited by examiner

*Primary Examiner* — Jane Rhee
(74) *Attorney, Agent, or Firm* — Robert E. Bushnell, Esq.

(57) ABSTRACT

A lithium rechargeable battery having corrosion resistance and a method of making the same. In the lithium rechargeable battery including a metal case, a cap plate and terminals, a protective layer is formed on at least portions of surfaces of the metal case, the cap plate and the terminals, and the protective layer is formed of a protective layer forming composition comprising at least one hydrophobic compound selected from the group consisting of substituted or unsubstituted 1,2,3-benzotriazole, alkoxysilance having 1 to 20 carbons, vinylakoxy silane having 1 to 20 carbons, and (meth) acryl silane, and chromic oxide.

11 Claims, 1 Drawing Sheet

LITHIUM RECHARGEABLE BATTERY AND METHOD OF MAKING THE SAME

CLAIM OF PRIORITY

This application makes reference to, incorporates into this specification the entire contents of, and claims all benefits accruing under 35 U.S.C. §119 from an application earlier filed in the Korean Intellectual Property Office filed on the 7th of Feb. 2012 and there duly assigned Korean Patent Application No. 10-2012-0012324.

BACKGROUND OF THE INVENTION

1. Field of the Invention

The present invention relates to a lithium rechargeable battery having improved corrosion resistance and a method of making the same.

2. Description of the Related Art

In general, unlike a primary battery, a rechargeable battery may be charged and discharged over and over again and may be used as a power source for various small portable electronic devices such as cellular phones, PDAs, notebook computers, and so on. Lithium secondary batteries have, in particular, been widely employed in the latest generation of electronics devices. The lithium secondary battery may have an operating voltage of 3.6 V, which is three times higher operating voltage than Ni—Cd or Ni-MH batteries widely used as power sources of electric-electronic devices. In addition, the lithium secondary battery may exhibit a relatively high energy density per unit weight.

The lithium rechargeable battery generally employs a lithium based oxide as a positive electrode active material and a carbonaceous material as a negative electrode active material. Here, the lithium rechargeable battery may be manufactured in various shapes, e.g., cylindrical can types, rectangular or prismatic can types, pouch types, etc.

A case used for a lithium rechargeable battery is made of a metallic material having excellent processability such as aluminum or iron. The metallic material may be readily affected by external surroundings. In particular, aluminum, which is an amphoteric metal, has highly processable and is widely used in lithium ion rechargeable batteries. However, aluminum is liable to corrosion under acidic and alkali environments, which may generate salts, resulting in a reduction of the weight of the lithium ion rechargeable battery or deterioration in battery characteristics such as a voltage drop.

SUMMARY OF THE INVENTION

It is therefore a feature of the present invention to provide a lithium rechargeable battery, which can improve corrosion resistance against external surroundings and can prevent deterioration of battery quality and reliability.

It is another feature of the present invention to provide a method of making the lithium rechargeable battery.

At least one of the above and other features and advantages may be realized by providing a lithium rechargeable battery including a metal case, a cap plate and terminals, wherein a protective layer is formed on at least portions of surfaces of the metal case, the cap plate and the terminals, and the protective layer is formed of a protective layer forming composition comprising at least one hydrophobic compound selected from the group consisting of substituted or unsubstituted 1,2,3-benzotriazole, alkoxysilance having 1 to 20 carbons, vinylalkoxy silane having 1 to 20 carbons, and (meth)acryl silane; and chromic oxide.

The protective layer may include the chromic oxide and the hydrophobic compound in a weight ratio of 0.01:1 to 1:1 (w/w).

The vinylalkoxysilane may include at least one selected from the group consisting of vinylmethoxysilane, vinyltris(2-methoxyethoxy)silane and vinylethoxysilane.

The protective layer forming composition may further include a solvent and the hydrophobic compound may be contained in a concentration of 0.1 g/L to 10 g/L.

The protective layer forming composition may have pH in a range of 3.0 to 4.5.

The protective layer may have a thickness in a range of 0.01 to 0.1 μm.

The protective layer may be formed by immersing or spraying the protective layer forming composition.

At least one of the above and other features and advantages may be realized by providing a method of making a lithium rechargeable battery, the method including forming a protective layer by immersing or spraying a protective layer forming composition to at least portions of surfaces of a metal case, a cap plate and terminals, and drying the protective layer.

The protective layer forming composition may include at least one hydrophobic compound selected from the group consisting of substituted or unsubstituted 1,2,3-benzotriazole, alkoxysilance having 1 to 20 carbons, vinylalkoxy silane having 1 to 20 carbons, and (meth)acryl silane; and chromic oxide.

The chromic oxide and the hydrophobic compound may be contained in the protective layer in a weight ratio of 0.01:1 to 1:1 (w/w).

The protective layer forming composition may have pH in a range of 3.0 to 4.5.

The drying of the formed protective layer may be performed at 60 to 80° C. for 20 minutes to one hour.

According to the present invention, a uniform hydrophobic protective layer can be formed on a surface of a metal case or terminals, exposed to external surroundings of the lithium rechargeable battery. In addition, battery quality and reliability can be prevented by preventing the metal case or terminals from being corroded against the external surroundings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Example embodiments will now be described more fully hereinafter with reference to FIGS. 1 and 2.

Figure 1:
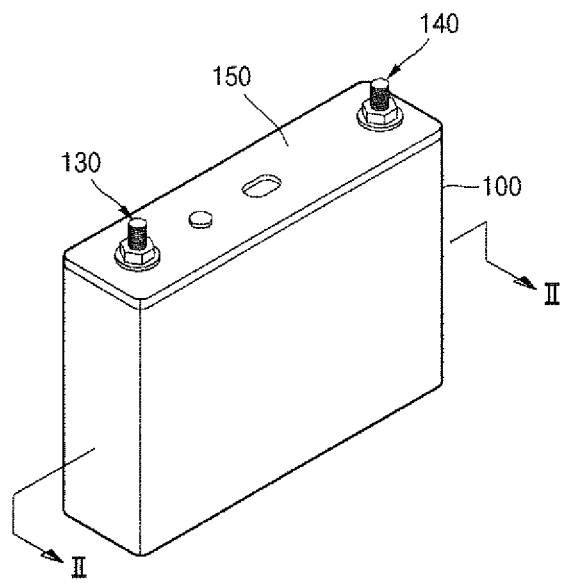
FIG. 1 is a perspective view of a lithium rechargeable battery according to an embodiment of the present invention.
Figure 2:
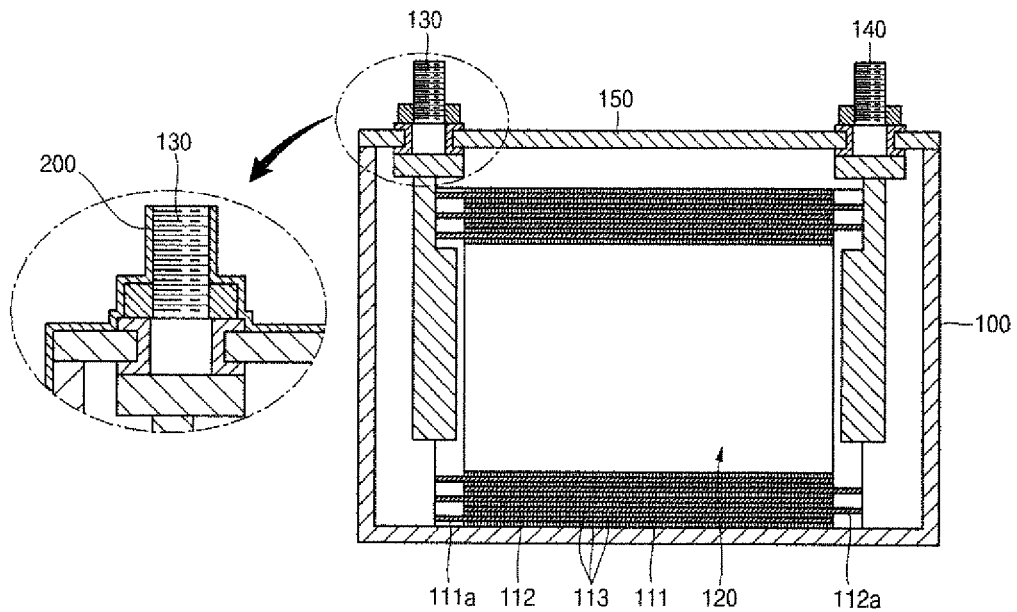
FIG. 2 is a cross-sectional view taken along the line II-II, illustrating essential parts of the lithium rechargeable battery shown in FIG. 1.

FIG. 1 is a perspective view of a lithium rechargeable battery according to an embodiment of the present invention, and FIG. 2 is a cross-sectional view taken along the line II-II, illustrating essential parts of the lithium rechargeable battery shown in FIG. 1.

The present invention provides a lithium rechargeable battery having a hydrophobic protective layer on its surface.

Since the lithium rechargeable battery includes the protective layer including a hydrophobic compound demonstrating low resistance and capable of maintaining a hydrophobic property for a long time, it is possible to prevent current from moving between electrode terminals and a metal case or a cap plate due to external moisture or solution, thereby preventing surface corrosion and providing high reliability.

The protective layer is formed of a protective layer forming composition comprising a hydrophobic compound and chromic oxide. The hydrophobic compound is capable of preventing current movement between the electrode terminals and the metal case or the cap plate due to external moisture or solution by maximizing a contact angle between the hydrophobic compound and a solution, and can maintain its hydrophobic property for a long time while having high resistance so as not to affect battery characteristics, thereby providing high reliability of battery.

The hydrophobic compound may include at least one hydrophobic compound selected from the group consisting of substituted or unsubstituted 1,2,3-benzotriazole, alkoxysilance having 1 to 20 carbons, vinylalkoxysilane having 1 to 20 carbons, and (meth)acryl silane. The hydrophobic compound is preferably an unsubstituted 1,2,3-benzotriazole compound or vinylalkoxysilane (vinyl alkoxysilane).

Specific examples of the substituted 1,2,3-benzotriazole may include a 1,2,3-benzotriazole compound substituted by a substituent group such as alkyl, alkoxy or phenyl.

Specific examples of the alkoxysilance having 1 to 20 carbons may include tetraethoxysilane, dibutoxydimethylsilane, butoxytrimethylsilane, butyltrimethoxysilane, methyltriisopropoxysilane, tetraphenoxysilane, and tetrapropoxysilane.

Specific examples of the vinylalkoxy silane having 1 to 20 carbons may include vinylmethoxysilane, vinyltris(2-methoxyethoxy)silane, and vinylethoxysilane.

Specific examples of the (meth)acryl silane may include 3-methacryloxypropyltrimethoxysilane, and 3-methacryloxypropyltriethoxysilane.

When the chromic oxide is used with the hydrophobic compound, moisture resistance and oxidation resistance can be improved. The chromic oxide is preferably chromium (VI) oxide ($CrO_3$). The chromic oxide and the hydrophobic compound may be contained in a weight ratio of 0.01:1 to 1:1 (w/w). If the weight ratio of the chromic oxide compound is less 0.01, the effects of improving moisture resistance and oxidation resistance, which are demonstrated by adding chromic oxide, may be negligible. If the weight ratio of the chromic oxide compound is greater than 1, there is a great potential for discoloration. Thus, since stains are generated due to chromic components adhered to a surface on which the protective layer is formed, the quality of the product having the surface may be deteriorated.

A pH level of the protective layer forming composition may be adjusted to be in a range of 3.0 to 4.5. The pH adjustment may be performed using a potassium hydroxide solution. If the pH level is in this range, the hydrophobic compound and the chromic oxide may be added and homogenously mixed, thereby preventing a concentration change of the composition and preventing stains from being generated after the forming of the protective layer.

The protective layer forming composition further includes a solvent in a balance amount. The solvent may include water or a mixture of water and an alcoholic organic solvent having 1 to 12 carbons.

In the protective layer forming composition, the hydrophobic compound may be contained in a concentration of 0.1 to 10 g/L. If the concentration of the hydrophobic compound is less than 0.1 g/L, it is difficult to demonstrate a hydrophobic property, resulting in a voltage drop of battery or generation of salt due to corrosion according to external surroundings. If the concentration of the hydrophobic compound is greater than 10 g/L, agglomeration may be generated among undissolved hydrophobic compounds after forming the protective layer, resulting in surface stains.

The protective layer may have a thickness in a range of 0.01 to 0.1 μm, preferably 0.01 to 0.05 μm.

The protective layer may be formed by spraying or electrochemically immersing the protective layer forming composition on or in a surface of the protective layer. The method of forming the protective layer will later be described in more detail.

Hereinafter, a configuration of the lithium rechargeable battery will be described in more detail with reference to FIGS. 1 and 2.

The lithium rechargeable battery having the protective layer 200 will be described according to an exemplary embodiment of the present invention. The lithium rechargeable battery includes a metal case 100 having the protective layer 200 formed on its outer surface, a cap plate 150 and electrode terminals 130 and 140.

Referring to FIG. 1, the metal case 100 accommodates an electrode assembly 120 (FIG. 2) and is shaped of a plate made of a conductive material or a metal alloy. The metal alloy is preferred. Specific examples of the metal alloy may include aluminum or an aluminum alloy. The metal case 100 may have a plate-shaped body fabricated into a cylindrical, prismatic or pouch-type shape according to the battery shape. The prismatic shape is preferred. As described above, the protective layer 200 (FIG. 2) may be formed on the outer surface of the metal case 100. Corrosion due to external factors can be prevented by forming the protective layer, thereby preventing a weight loss or voltage drop of battery due to salt generation. Compositions of the protective layer are the same as described above.

Referring to FIG. 2, the electrode assembly 120 is a major component for performing charging or discharging, including a positive electrode plate 111, a negative electrode plate 112, and a separator 113. The positive electrode plate 111 and the negative electrode plate 112 are stacked with the separator 113 interposed there between.

Various components of the electrode assembly 120 will now be described. The positive electrode plate 111 includes a positive electrode current collector formed of a metal thin plate having excellent conductivity, for example, aluminum foil, and a positive electrode active material layer coated on both surfaces of the positive electrode current collector. In addition, a positive electrode current collector region having a positive electrode active material not formed therein, that is, a positive electrode uncoated region 111a, is formed at an end of the positive electrode plate 111. In addition, a positive electrode terminal 130, which is generally made of aluminum and protrudes a predetermined length from the electrode assembly 120, is coupled to the end of the positive electrode uncoated region 111a.

The negative electrode plate 112 includes a negative electrode current collector formed of a metal thin plate having excellent conductivity, for example, a copper or nickel foil, and a negative electrode active material layer coated on both surfaces of the negative electrode current collector. In addition, a negative electrode current collector region having a negative electrode active material not formed therein, that is, a negative electrode uncoated region 112a, is formed at an end of the negative electrode plate 112. In addition, a negative electrode terminal 140, which is generally made of nickel and protrudes a predetermined length from the electrode assembly 120, is coupled to an end of the negative electrode uncoated region 112*a*.

The separator 113 may serve to prevent short circuits between the positive and negative electrode plates 111 and 112 and may be made of a porous polymer material to allow lithium ions to pass.

Referring to FIGS. 1 and 2, the cap plate 150 shaped of a planar rectangular plate is positioned on a top portion of the metal case 100, and electrode terminals 130 and 140 are formed in a terminal groove and a terminal hole (not shown). As described above, the protective layer 200 according to the present invention can be formed on outer surfaces of metal case 100, the cap plate 150 and the electrode terminals 130 and 140. Since the protective layer 200 is formed on the electrode terminals 130 and 140, corrosion of the electrode terminals 130 and 140 due to external moisture or solution can be prevented. In addition, a voltage drop due to current movement to the cap plate 150 or the metal case 100 can be prevented. Components of the protective layer are the same as described above.

The lithium rechargeable battery may be a lithium ion rechargeable battery or a lithium polymer rechargeable battery and may be used for power supply of automotive vehicles.

The present invention also provides a method of making the inventive lithium rechargeable battery having a protective layer.

The method of making the lithium rechargeable battery includes forming a protective layer and drying the protective layer.

The forming of the protective layer comprises forming the protective layer by coating a protective layer forming composition according to the present invention on a surface of the lithium rechargeable battery. In forming of the protective layer, by using the composition a uniform layer is formed on the entire surface of the lithium rechargeable battery to prevent occurrence of local corrosion, thereby preventing deterioration of battery characteristics.

The protective layer forming composition is prepared as a homogenized mixture formed by adding a solvent to one or more hydrophobic compounds stated above, adding chromic oxide thereto, stirring at 25 to 35° C., and adding an aqueous potassium hydroxide solution dropwise to the resultant mixture in a concentration of 0.1 to 0.5 g/Liter in order to adjust a pH level.

The forming of the protective layer may be performed by spraying or immersing the protective layer forming composition. For the spraying, a spray coating method that is generally known in the related art may be employed. The forming of the protective layer may include spraying the composition on a surface of an assembled lithium rechargeable battery assembly or individually spraying the composition to components exposed to the outside. For example, the composition is sprayed to surfaces of a metal case, electrode terminals and a cap plate in the lithium rechargeable battery assembly. Alternatively, the composition may be individually sprayed to surfaces of the metal case, the electrode terminals and the cap plate before the metal case, the electrode terminals and the cap plate are assembled.

The electrochemically immersing may be performed by individually immersing components exposed to the outside of the lithium rechargeable battery assembly. For example, before the metal case, the electrode terminals and the cap plate are assembled, the individual components of the metal case, the electrode terminals and the cap plate may be electrochemically immersed in the protective layer forming composition.

The drying is performed at 60 to 80° C. for 20 minutes to one hour after the forming of the protective layer to remove the solvent.

The following examples illustrate the present invention in further detail, but it is understood that the present invention is not limited by these examples.

EXAMPLES AND COMPARATIVE EXAMPLES (1) Preparation of Coating Composition

As shown in Table 1, 1,2,3-benzotriazole compound and distilled water (1 Liter) were mixed and stirred at 25° C. for 10 minutes, followed by adding chromic oxide ($CrO_3$) to the mixture. 0.1 to 0.5 g of sodium hydroxide was added dropwise to adjust a pH level of the composition to 2.5 to 4.5, followed by stirring to form a homogenous mixture.

(2) Formation of Protective Layer

The coating composition was sprayed to the metal case, the electrode terminals and the cap plate of lithium rechargeable battery to a thickness of approximately 0.01 to 0.1 μm using a sprayer, followed by drying at 25° C. for one minute or less.

TABLE 1

| Unit (g) | Example 1 | Example 2 | Comparative Example 1 | Comparative Example 2 |
|---|---|---|---|---|
| (A) | 1 | 10 | 0 | 1 |
| (B) | 0.1 | 0.5 | 0 | 0 |

(A) 1,2,3-benzotriazole
(B) chromic oxide ($CrO_3$)

Experimental Example (1) Evaluation of Reliability of Lithium Rechargeable Battery In order to evaluate the reliability of a lithium rechargeable battery, the open-circuit voltage (OCV) and weights of batteries were measured and investigated whether there were changes in the OCVs and weights.

For measurement of a voltage change between electrode terminals of the lithium rechargeable battery, the OCV and alternating-current (AC) resistance (1 kHz) were measured. Equipment used for measurement was a Hioki 3560 tester. The voltage and resistance of terminals of both electrodes (that is, positive and negative electrodes) were measured using two probes.

(2) Corrosion Test

A salt spray corrosion test was employed as specified in ISO 16750-4 according to IEC60068-2-52.

The salt spray corrosion test was carried out by spraying for 2 hours using aqueous 5% wt sodium chloride solution under experimental conditions including a temperature of 35° C. and relative humidity of 90%. Thereafter, 3 cycles of the spraying were repeated at 40° C. and relative humidity of 93%. A distance between a salt water sprayer nozzle and a sample battery was 61 cm and the spraying was performed at a rate of 1.5 mA±0.5 mA per hour.

TABLE 2

|  | Example 1 | Example 2 | Comparative Example 1 | Comparative Example 2 |
|---|---|---|---|---|
| Voltage change | 34 mV drop | 29 mV drop | 44 mV Drop | 45 mV Drop |
| Weight change | 8 mg loss | 9 mg loss | 40 mg loss | 39 mg loss |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and detail may be made without departing from the spirit and scope of the present invention as set forth in the following claims.

What is claimed is:

1. A lithium rechargeable battery including a metal case, a cap plate and terminals, a protective layer being formed on at least portions of surfaces of the metal case, the cap plate and the terminals, and the protective layer is formed of a protective layer forming composition comprising at least one hydrophobic compound selected from the group consisting of substituted or unsubstituted 1,2,3-benzotriazole, alkoxysilane having 1 to 20 carbons, vinylalkoxysilane having 1 to 20 carbons, and (meth)acryl silane; and chromic oxide.

2. The lithium rechargeable battery of claim 1, the protective layer comprising the chromic oxide and the hydrophobic compound in a weight ratio of 0.01:1 to 1:1 (w/w).

3. The lithium rechargeable battery of claim 1, the vinylalkoxysilane including at least one selected from the group consisting of vinylmethoxysilane, vinyltris(2-methoxyethoxy)silane and vinylethoxysilane.

4. The lithium rechargeable battery of claim 1, the protective layer forming composition further comprising a solvent and the hydrophobic compound is contained in a concentration of 0.1 g/L to 10 g/L.

5. The lithium rechargeable battery of claim 1, the protective layer forming composition having a pH level in a range of 3.0 to 4.5.

6. The lithium rechargeable battery of claim 1, the protective layer having a thickness in a range of 0.01 to 0.1 μm.

7. The lithium rechargeable battery of claim 1, the protective layer being formed by immersing or spraying the protective layer forming composition.

8. A method of making a lithium rechargeable battery, the method comprising:
    forming a protective layer by immersing or spraying a protective layer forming composition to at least portions of surfaces of a metal case, a cap plate and terminals; and
    drying the protective layer,
    the protective layer forming composition comprising at least one hydrophobic compound selected from the group consisting of substituted or unsubstituted 1,2,3-benzotriazole, alkoxysilane having 1 to 20 carbons, vinylalkoxysilane having 1 to 20 carbons, and (meth)acryl silane; and chromic oxide.

9. The lithium rechargeable battery of claim 8, the chromic oxide and the hydrophobic compound, being contained in the protective layer in a weight ratio of 0.01:1 to 1:1 (w/w).

10. The lithium rechargeable battery of claim 8, the protective layer forming composition having a pH level in a range of 3.0 to 4.5.

11. The lithium rechargeable battery of claim 8, the drying of the formed protective layer being performed at 60 to 80° C. for 20 minutes to one hour.

* * * * *